P. Thayer,
Mower.
No. 14,781. Patented April 29, 1856.

UNITED STATES PATENT OFFICE.

PLINY THAYER, OF LANSINGBURG, NEW YORK.

IMPROVEMENT IN REAPING-MACHINES.

Specification forming part of Letters Patent No. 14,781, dated April 29, 1856.

*To all whom it may concern:*

Be it known that I, PLINY THAYER, of Lansingburg, in the county of Rensselaer and State of New York, have invented certain new and useful Improvements in the Construction of Harvesting-Machines; and I do hereby declare the following to be a full, clear, and exact description of the same, reference being had to the accompanying drawings, in which—

Figure 1:
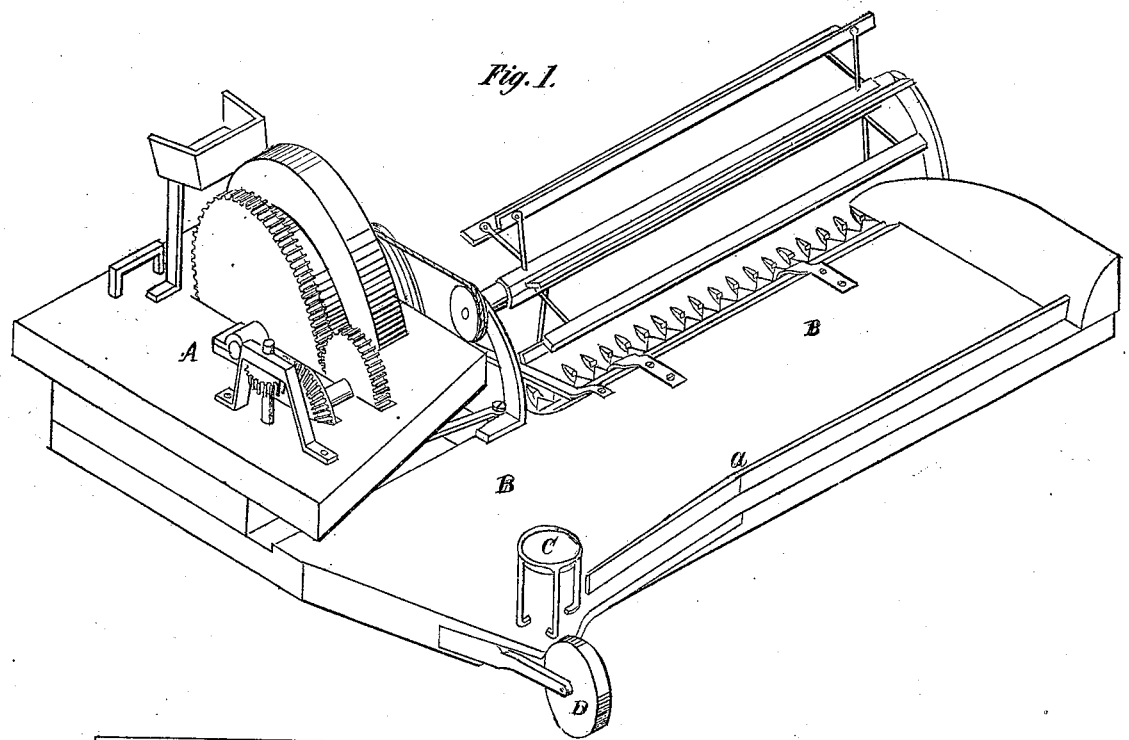
Figure 2:
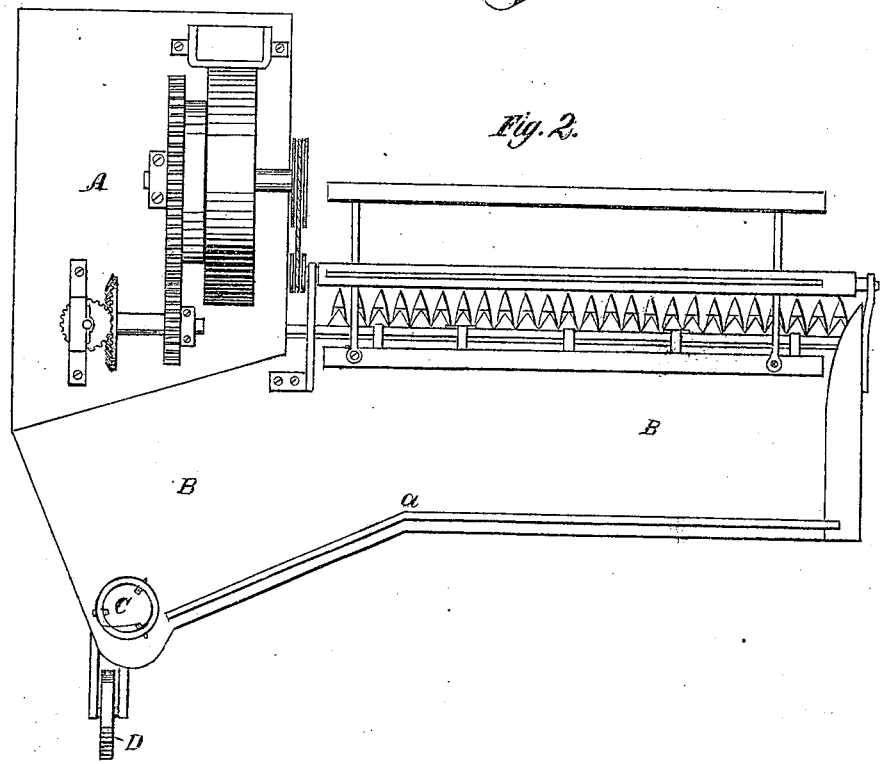

Figure 1 represents a perspective view of the machine, and Fig. 2 represents a top plan.

Similar letters, where they occur in the separate figures, denote like parts in both.

The nature of my invention relates to the peculiar position and inclination of the platform and raker's stand with regard to each other, so that the raker may sweep off the grain from the platform by a natural swing of his body or arms, which very much relieves him from the labor incident to this branch of grain-cutting by machinery.

To enable others skilled in the art to make and use my invention, I will proceed to describe the same with reference to the drawings.

Letters Patent of the United States were granted to me on the 11th day of March, 1856, for certain improvements in grass and grain harvesters, in which patent the general construction of my machine is set forth. In the present application, therefore, I shall confine the description mainly to those parts immediately connected with what is alleged to be the novel features not embraced in my aforesaid patent.

A represents the frame for carrying the main supporting and driving gear of the machine. On one side of this frame A is arranged the cutting apparatus, and behind the frame and cutting apparatus is the platform B. At that corner of the platform B which is farthest from the standing grain and behind the frame A is placed the raker's stand C, and near his stand a supporting-wheel, D, keeps that corner of the platform from the ground. That portion of the platform immediately in rear of the cutters is parallel to the line of cutters, but at or about the line *a* on said platform there is an angle or curve which projects the platform rearward and brings the raker's stand behind a line drawn through the plane of the platform, as seen in Fig. 2. The object of this angle or inclination in the platform is that the raker in reaching to the extreme end of the platform to rake off the gavel shall not be required to twist or unnecessarily bend his body, but have a perfectly free, easy, and natural sweep of his body, the platform conforming to such free motion of the raker. The gavels are thus delivered at the side of the machine, out of the way of the return-swath, without that severe labor which falls upon the raker when he must bend his body and arms to conform to the shape of the machine and point of delivery of the gavels. I make the machine conform to the motion of the raker instead of making the raker conform to the shape of the machine, and thus, as before stated, relieve him of the most arduous part of his duty.

Having thus fully described the nature of my invention, what I claim therein as new, and desire to secure by Letters Patent, is—

In combination with the raker's stand and the usual platform for receiving the cut grain, the rearward inclination and extension of said platform from the line *a*, so that the raker may move his rake with the natural sweep of his arms or body in raking the gavel from the platform, as set forth, and deliver it clear of the gearing.

PLINY THAYER.

Witnesses:
I. RANSOM,
J. D. COMSTOCK.